W. H. DOWNING & O. W. CHAMBERLAIN.
Device for Cleaning Rope for Paper Making.
No. 202,008. Patented April 2, 1878.
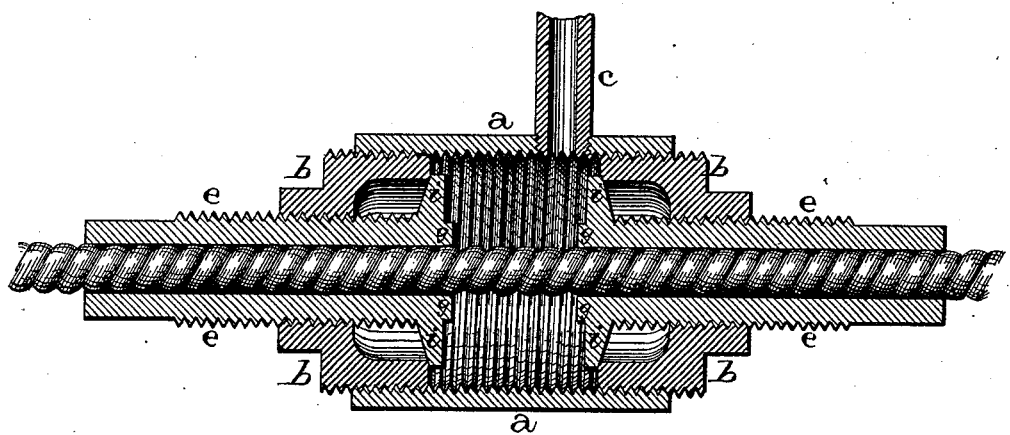
WITNESSES.
INVENTORS.

UNITED STATES PATENT OFFICE.

WILLIAM H. DOWNING AND OLIVER W. CHAMBERLAIN, OF FAIRVIEW TOWNSHIP, BUTLER COUNTY, PENNSYLVANIA.

IMPROVEMENT IN DEVICES FOR CLEANING ROPE FOR PAPER-MAKING.

Specification forming part of Letters Patent No. 202,008, dated April 2, 1878; application filed March 9, 1878.

*To all whom it may concern:*

Be it known that we, WM. H. DOWNING and OLIVER W. CHAMBERLAIN, of Fairview township, in the county of Butler and State of Pennsylvania, have invented certain new and useful Improvements in Devices for Cleaning Rope; and we do hereby declare the following to be a full, clear, and exact description of the invention, such as will enable others skilled in the art to which it pertains to make and use it, reference being had to the accompanying drawing, which forms part of this specification.

Our invention relates to an improvement in devices for cleaning rope; and it consists in a chamber provided with a bushing and a movable pipe in each end, through which pipes and cylinder a rope is drawn, so as to subject it to the action of steam or hot water, or both, which are admitted into the body of the cylinder through suitable communication with a boiler or injector, so as to clean the rope of all oil and dirt, and thus prepare it for making paper, and for other purposes, as will be more fully described hereinafter.

The accompanying drawing represents a vertical longitudinal section of our invention.

*a* represents a cylinder, of any suitable length and diameter, having a screw-thread in each end to receive a bushing, *b*, and a pipe, *c*, passing through its side so as to make connection with a steam-boiler or injector. Screwing through the bushes *b* are the pipes *e*, which have the wide flanges *i* formed upon their inner ends, and which flanges are nearly the diameter of the interior of the cylinder, and made to form a continuous nozzle around the pipes *e*. After the bushes have been screwed into position, these flanges can be made to approach or recede from each other, so as to increase or decrease the space between them in the cylinder, to regulate the amount of water or steam which is forced in from the boiler or injector. Upon the inner side of these flanges, around the hole through the pipe, are formed small flanges or projections *g*, which are intended to form a nozzle for the pipe *e*.

The rope to be cleaned has one end passed through the two pipes *e*, and then hot water or steam, or both, are forced from the boiler or injector, through the pipe *c*, into the cylinder. As the rope passes through this cylinder it is subjected to heat and water, so as to dissolve all the dirt and grease upon it. For convenience the rope is wound upon one reel, and after its end has been passed through the cylinder it is wound upon another reel, and thus is drawn through at any desired rate of speed.

Where different-sized ropes are to be cleaned, pipes *e*, having different-sized holes through them, will be used. By means of the devices above described, ropes can be cleaned very rapidly of all the dirt and grease upon them, without any other cost or expense than that of the steam or hot water from the boiler or injector.

Having thus described our invention, we claim—

1. A cylinder, *a*, in combination with a steam or water pipe, *c*, and bushes or pipes for inserting into the ends of the cylinder, substantially as shown.

2. The combination of the cylinder *a*, bushes *b*, and adjustable pipes *e*, substantially as described.

In testimony that we claim the foregoing we have hereunto set our hands.

WILLIAM H. DOWNING.
OLIVER W. CHAMBERLAIN.

Witnesses:
S. FLEEGER,
CHAS. HUNTLY.